United States Patent
Tanaka

(10) Patent No.: US 7,289,411 B2
(45) Date of Patent: Oct. 30, 2007

(54) OPTICAL DISC APPARATUS

(75) Inventor: Masashi Tanaka, Iruma (JP)

(73) Assignee: TEAC Corporation, Musashino-shi (JP)

( * ) Notice: Subject to any disclaimer, the term of this patent is extended or adjusted under 35 U.S.C. 154(b) by 552 days.

(21) Appl. No.: 10/370,208

(22) Filed: Feb. 19, 2003

(65) Prior Publication Data
US 2003/0156516 A1    Aug. 21, 2003

(30) Foreign Application Priority Data
Feb. 20, 2002    (JP)    ............. 2002-043060

(51) Int. Cl.
*G11B 7/00*    (2006.01)
(52) U.S. Cl. ............. 369/53.37; 369/30.15; 369/30.17; 369/44.28
(58) Field of Classification Search ............. 369/53.3, 369/53.1, 53.15, 53.28, 53.29, 53.37, 53.42, 369/30.1, 30.15, 30.17, 47.39, 44.27, 44.28, 369/44.34, 44.29, 53.26, 47.41, 53.39
See application file for complete search history.

(56) References Cited

U.S. PATENT DOCUMENTS

| | | | | |
|---|---|---|---|---|
| 5,398,221 | A * | 3/1995 | Ogawa ............. | 369/30.15 |
| 5,483,507 | A * | 1/1996 | Ogino ............. | 369/30.15 |
| 5,905,701 | A * | 5/1999 | Lee et al. ............. | 369/44.28 |
| 5,986,988 | A * | 11/1999 | Kusano et al. ............. | 369/47.41 |
| 6,246,651 | B1 * | 6/2001 | Fukinuki et al. ............. | 369/53.3 |
| 6,310,845 | B1 * | 10/2001 | Kanenaga et al. ............. | 369/53.1 |
| 6,445,649 | B1 * | 9/2002 | Saito et al. ............. | 369/30.1 |
| 7,082,086 | B2 | 7/2006 | Okajima et al. | |
| 2001/0030916 | A1 * | 10/2001 | Lee ............. | 369/44.29 |

FOREIGN PATENT DOCUMENTS

| | | |
|---|---|---|
| JP | 8-96486 | 4/1996 |
| JP | 8-106739 | 4/1996 |
| JP | 2000251272 | 9/2000 |
| JP | 2003-178470 | 6/2003 |
| KR | 2002-10679 A | 2/2001 |

OTHER PUBLICATIONS

Office Action (Final Rejection) mailed Nov. 14, 2006, issued in corresponding Japanese App. No. 2002-043060.

* cited by examiner

*Primary Examiner*—Andrea Wellington
*Assistant Examiner*—Kim-Kwok Chu
(74) *Attorney, Agent, or Firm*—Christensen O'Connor Johnson Kindness PLLC

(57) ABSTRACT

The present invention provides an optical disc apparatus capable of rotating an optical disc with high speed while enabling reduced current consumption. The optical disc apparatus comprises a spindle motor for rotating the optical disc and a thread motor for driving an optical pick-up. When a command is received while the spindle motor is driven, a controller delays operation of the thread motor for a predetermined duration to allow operation of the spindle motor rather than immediately activating the thread motor. After the predetermined duration has elapsed, the controller activates the thread motor and halts the operation of the spindle motor. The predetermined duration may be either a fixed value or a variable value established so as to become smaller as rotation speed of the optical disc increases.

8 Claims, 8 Drawing Sheets

OPTICAL DISC APPARATUS

BACKGROUND OF THE INVENTION

1. Field of the Invention

The present invention relates to an optical disc apparatus, and more particularly to a reduction of power consumption associated with driving of an optical disc and driving of an optical pickup.

2. Description of the Related Art

In order to reduce current consumed during operation, CD drives, DVD drives, or the like of portable type conventionally employ technology for controlling a motor (spindle motor) for rotating an optical disc and a motor (thread motor) for driving an optical pick-up in a radial direction of the optical disc to execute seeks so as to prevent concurrent driving of the two motors.

For example, in Japanese Patent Laid-Open Publication No. 2000-251272, technology where operation of a spindle motor for rotating an optical disc is disabled by activating current control means whenever seek control means moves an optical head is disclosed.

Because a spindle motor expends a relatively large current, by temporarily restricting rotative driving of the optical disc as described above, it becomes possible to suppress an increase of current consumption. On the other hand, because rotative driving of the optical disc is restricted, there arises a problem that the time lapse before the optical disc attains the target rotational speed becomes longer.

It is assumed that, for example, a drive goes into standby mode after a lapse of a predetermined time since the drive accepted the last access from a host device such as a notebook PC. In the standby mode (power-saving mode), the drive returns to normal operation mode (resumes) when a read command is issued by the host device. In this normal operation mode, if the rotative driving of the optical disc is temporarily paused during seek movement, the rotational speed of the optical disc would decrease due to a rotation load, thereby causing a longer time to elapse before attaining the target rotational speed of the optical disc. When the optical disc does not attain the target rotational speed, reproduction rate does not increase adequately. The lower reproduction rate produces a problem that originally included reproduction performance cannot be delivered.

FIG. 9 shows changes of the rotational speed and current consumption with respect to time in a prior-art drive. When the drive resumes from standby mode by a read command input from the host device, a spindle motor accelerates the optical disc to gradually increase the rotational speed of the disc. However, when rotative driving by the spindle motor is temporarily paused to execute seek movement, the rotational speed of the optical disc decreases due to rotation load. After desired data is read, the spindle motor is reactivated to accelerate the optical disc. Because the spindle motor is again paused to initiate seek movement when the read command is further input, the optical disc spends a longer time attaining the target rotational speed, thereby forcing data reading at low reproduction rate.

SUMMARY OF THE INVENTION

The present invention provides an optical disc apparatus capable of driving an optical disc so as to quickly attain a target rotation speed with reduced current consumption.

An optical disc apparatus according to the present invention comprises an optical disc driver for rotating an optical disc, an optical pick-up for recording/reproducing data on/from the optical disc, an optical pick-up driver for driving the optical pick-up in a radial direction of the optical disc, and a controller for controlling operation of the optical disc driver and operation of the optical pick-up driver. In the optical disc apparatus, when a request for activating the optical pick-up driver is made while the optical disc driver is driven, the controller delays activation of the optical pick-up driver to allow driving operation of the optical disc driver. According to the present invention, when the request for activating the optical pick-up driver is made, for example, when a command is receipt, activation of the optical pick-up driver is delayed rather than immediately halting the operation of the optical disc driver to activate the optical pick-up driver. By delaying activation of the optical pick-up driver to put higher priority on the operation of the optical disc driver, the optical disc can be quickly accelerated.

According to an embodiment of the present invention, a delay duration is specified as a fixed length of time. According to another embodiment of the present invention, the delay duration is a variable length of time. When the delay duration is specified as the variable length of time, the delay duration may be established so as to become shorter as a rotation speed of the optical disc increases. Because the necessity for placing a higher priority on the operation of the optical disc driver is lost after the optical disc attains a target rotation speed, it becomes possible to immediately activate the optical pick-up driver by setting the delay duration to zero.

The present invention will be clearly understood by reference to the following descriptions and examples. It is however to be understood that the spirit or the scope of this invention is not limited to the following examples.

DESCRIPTION OF THE PREFERRED EMBODIMENTS

Referring to drawings, preferred embodiments of the present invention will be described below.

Figure 1:
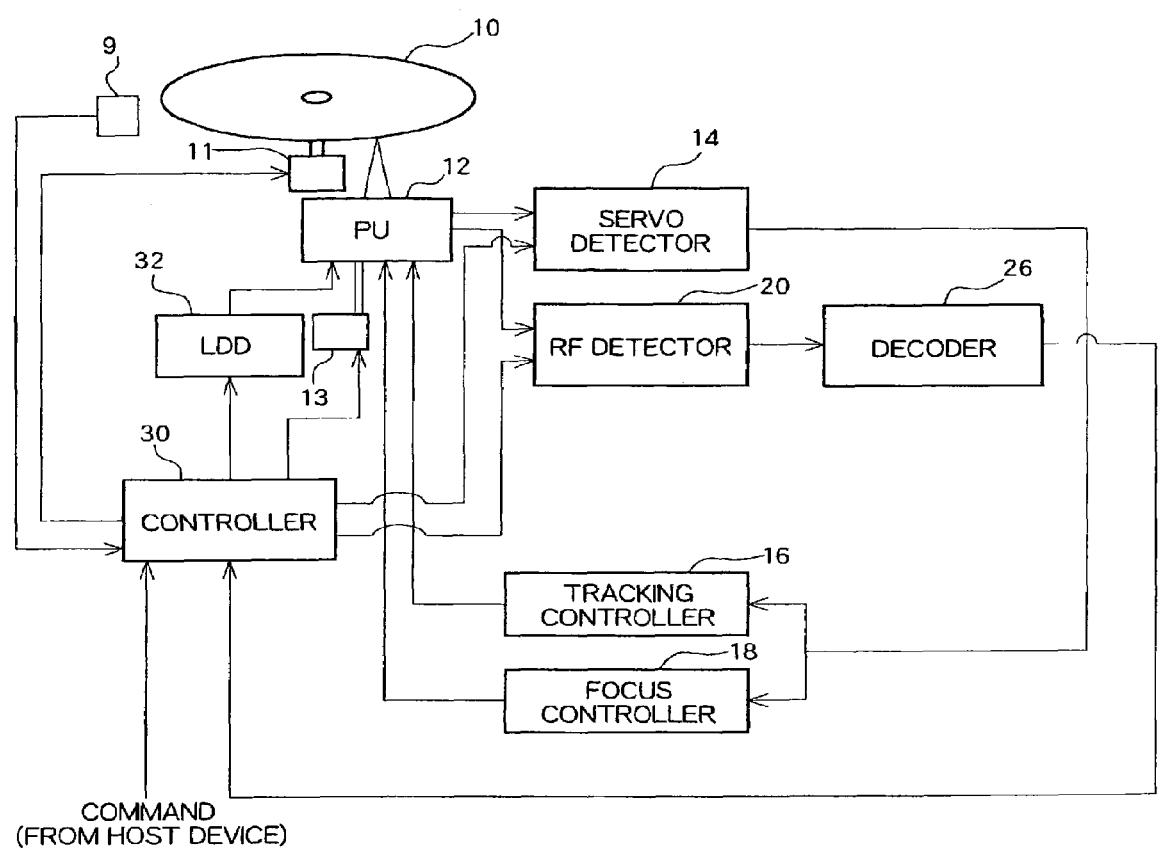
FIG. 1 is a block diagram showing the structure of an optical disc apparatus.

FIG. 1 is a block diagram illustrating a structure of an optical disc apparatus according to an embodiment. An optical disc 10 for CD-ROM, CD-R/RW, DVD-ROM, DVD-R/RW, or the like is rotated by a spindle motor 11. A rotation speed (the rotational speed) of the optical disc 10 is detected by a sensor 9 and then provided to a controller 30. Alternatively, the rotation speed of the optical disc 10 may be detected by a method of using the output of a PLL as a FG (frequency tachometer generator) for the spindle motor 11 or may be determined by detecting a wobble frequency when wobble is contained in the optical disc 10. Further, because the maximum value (Tmax) and the minimum value (Tmin) among pit lengths of signals written in a disc are predetermined, the rotation speed may be obtained after a reproduction signal is binarized by measuring or detecting the pulse length of the binarized reproduction signal to find Tmax or Tmin and then comparing the obtained Tmax or Tmin with the predetermined length.

An optical pick-up (PU) 12 placed so as to be opposed to the optical disc 10 includes a laser diode (LD) which irradiates laser light onto the surface of the optical disc 10. The laser diode driven by a laser diode driving circuit (LDD) 32 irradiates laser light with a reproducing power when data is being reproduced and irradiates laser light with a recording power when data is being recorded (the recording power is larger than the reproducing power). The optical pick-up 12 further comprises a photo detector which converts laser light reflected from the optical disc 10 into electrical information and outputs a reproduction signal to a servo detector 14 and an RF detector 20. The optical pick-up 12 is driven by a thread motor 13 in a radial direction of the optical disc 10.

In order to execute data recording/reproducing to/from an arbitrary sector of the optical disc 10, the thread motor 13 moves the optical pick-up 12 to a desired radius position (track position). The operation of the spindle motor 11 and the operation of the thread motor 13 are both controlled by the controller 30.

The servo detector 14 generates a tracking error signal and a focus error signal according to a signal from the optical pick-up 12 and then outputs the generated tracking error signal to a tracking controller 16 and the generated focus error signal to a focus controller 18. The tracking controller 16 drives the optical pick-up 12 in a widthwise direction of a track of the optical disc 10 according to the tracking error signal to bring the optical pick-up 12 to an on-track state. On the other hand, the focus controller 18 drives the optical pick-up 12 in a focus direction according to the focus error signal to bring the optical pick-up 12 into an on-focus state. In a four-segmented photo detector, for example, the tracking error signal is generated from a difference between detectors segmented in the radius direction and the focus error signal is generated from a difference between the diagonal sums of the four-segmented photo detector. Other schemes instead of the above method may also be employed.

The RF detector 20 generates a reproduction RF signal by amplifying the signal obtained from the optical pick-up 12, equalizes the generated signal through an equalizer, further binarizes the equalized signal, and then outputs the resulting signal to a decoder 26 which demodulates the received binary signal to output the signal to the controller 30. This demodulation is carried out by extracting a signal using a synchronous clock signal generated in a PLL circuit.

The controller 30 controls each operation of the servo detector 14, the RF detector 20, the LDD 32, and others, and outputs demodulated data obtained from the decoder 26 to a host device such as a personal computer. Further, the controller 30 inputs a command issued from the host device to control each operation of the spindle motor 11 and the thread motor 13, to thereby reduce current consumption. More specifically, in order to avoid a situation where rotative movement of the optical disc 10 executed by the spindle motor 11 and seek movement of the optical pick-up 12 executed by the thread motor 13 overlap with one another, basically, each movement timing is shifted as follows. When a read command, a write command, or other command is input from the host device, initiation of seek movement is delayed for a predetermined duration rather than halting the operation of the spindle motor 11 to immediately initiate seek movement. During the delay duration, rotative driving of the optical disc 10 executed by the spindle motor 11 is allowed. Accordingly, execution of the seek movement is delayed, but the spindle motor 11 can continue rotative driving of the optical disc 10 for the delay duration, thereby enabling quick acceleration of the optical disc 10 to the target rotational speed.

Figure 2:
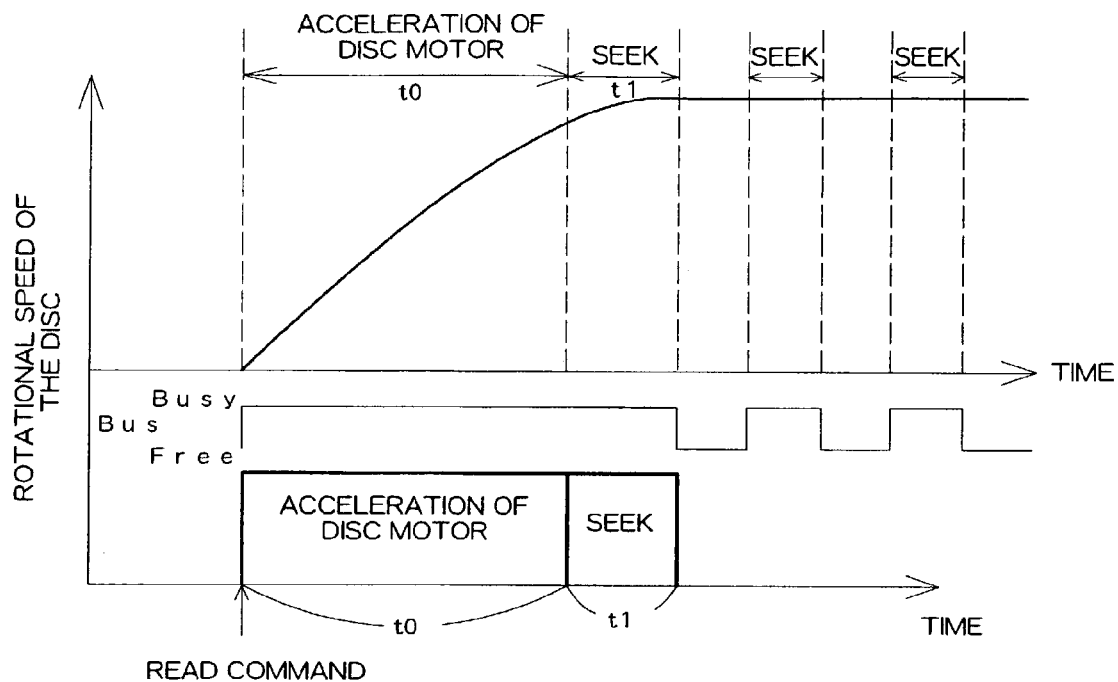
FIG. 2 is a drawing for explaining delay of seek movement.

FIG. 2 schematically represents execution timing of seek movement carried out by the controller 30. When the drive in standby mode is resumed by a read command issued by the host device, the controller 30 delays seek movement for a remaining time t0 (for example, 6.5 seconds) obtained by subtracting a time t1 necessary to complete seek process (for example, 0.5 seconds) from a time (for example, 7 seconds) accepted by the host device as a command execution duration (a busy state). During the delay duration t0 of seek movement, the rotative driving of the optical disc 10 executed by the spindle motor 11 is maintained to allow acceleration of the optical disc 10. When the time spent for acceleration of the optical disc 10 (6.5 seconds, in this example) is adequate to reach the target rotational speed, it is possible that the optical disc 10 will have attained the target rotational speed at the instant when a bus free status is obtained after processing of the command initially received in standby mode. Once the optical disc 10 has attained the target rotational speed, the necessity of delaying the seek movement to allow the spindle motor 11 to accelerate the optical disc 10 no longer exists. Accordingly, after the target rotational speed is attained, the spindle motor 11 is paused at the instant when the read command is issued so as to immediately execute the seek movement.

It should be noted here, that at the time of resuming from the standby mode, if the optical disc 10 is still in a state at low speed, a longer acceleration time is needed, but if the optical disc 10 has been accelerated to the rotational speed near the target, such a longer acceleration time is not required. Accordingly, the delay duration t0 of seek movement may be determined as a variable length of time. More specifically, the delay duration t0 may be established so as to become smaller as the rotational speed of the optical disc 10 increases.

Figure 3:
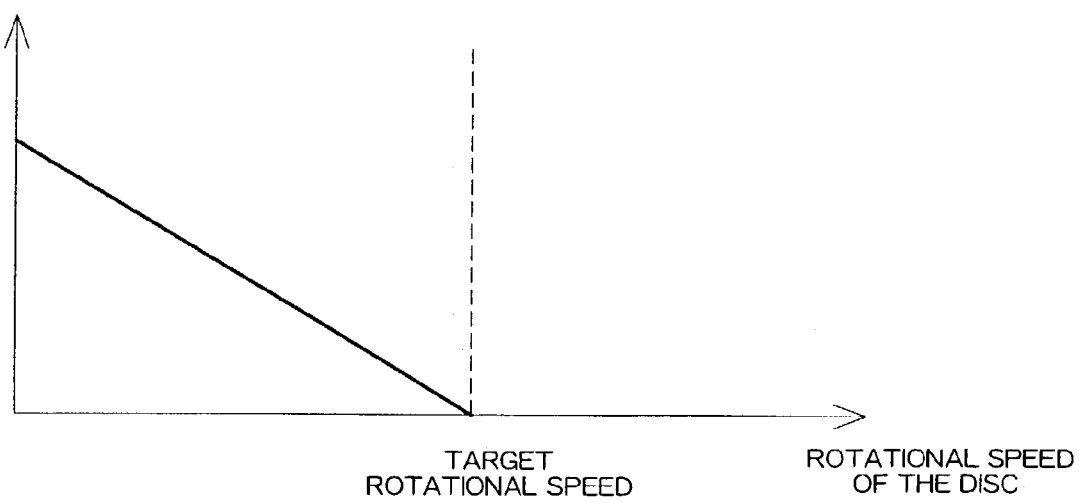
FIG. 3 is a graph representing relationship between the rotational speed of the disc and a delay duration.

FIG. 3 shows a relationship between the rotational speed of the optical disc and the delay duration t0 (the time between issue of a command from the host and initiation of the seek movement). As shown in FIG. 3, by shortening the delay duration of seek as the rotational speed of the optical disc 10 increases, delay of seek movement can be appropriately minimized. After the optical disc attains the target rotational speed, the seek movement can be initiated immediately, as described above. It is also possible for the delay duration t0 of seek to be fixedly set to, for example, 6.5 seconds until the target rotational speed is attained.

Figure 4:
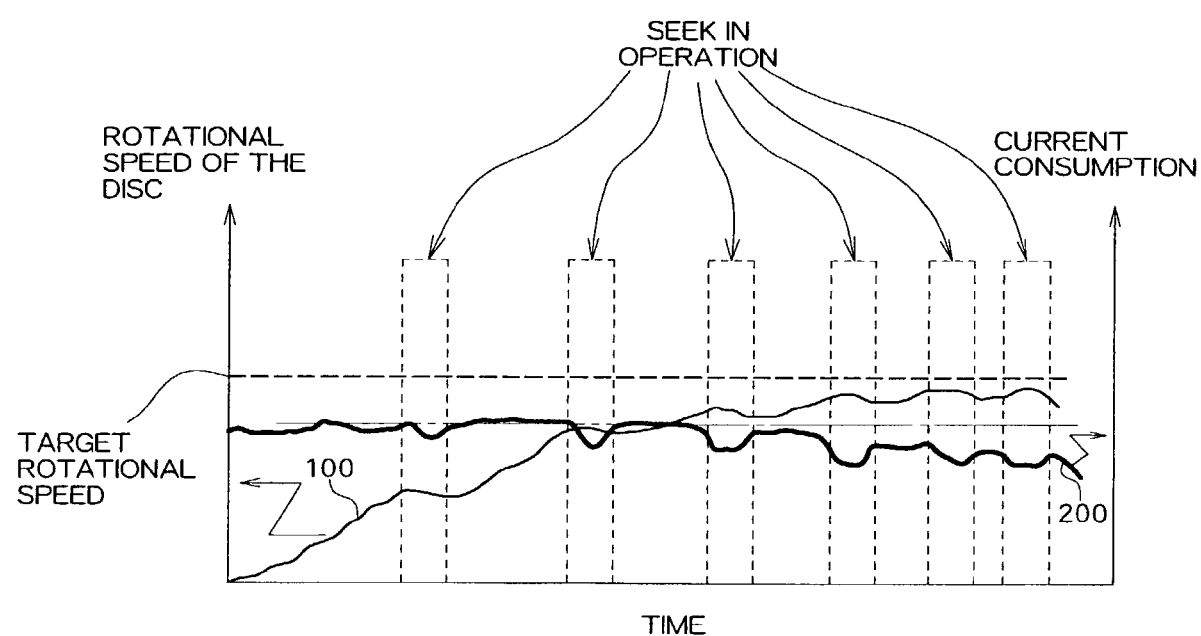
FIG. 4 is a graph representing change of the rotational speed of the disc and current consumption with respect to time.

FIG. 4 shows relationship between the rotational speed of the optical disc and current consumption in a case where the delay duration t0 of seek movement is diminished as the rotational speed of the optical disc increases as shown in FIG. 3. In FIG. 4, plotting time along the abscissa, change of the rotational speed of the disc with respect to time is indicated by line 100 and change of current consumption with respect to time is indicated by line 200. While the rotational speed is small, delay duration t0 of seek movement is long and time intervals between seek movements are increased. As a result of the increased time intervals between seek movements, the disc can be quickly accelerated and made to approach the target rotational speed. On the other hand, when the rotational speed of the disc becomes greater, delay duration t0 becomes smaller and the time intervals between seek movements are thereby shortened. With the decreased time intervals between seek movements, data can be read or written swiftly.

Figure 5:
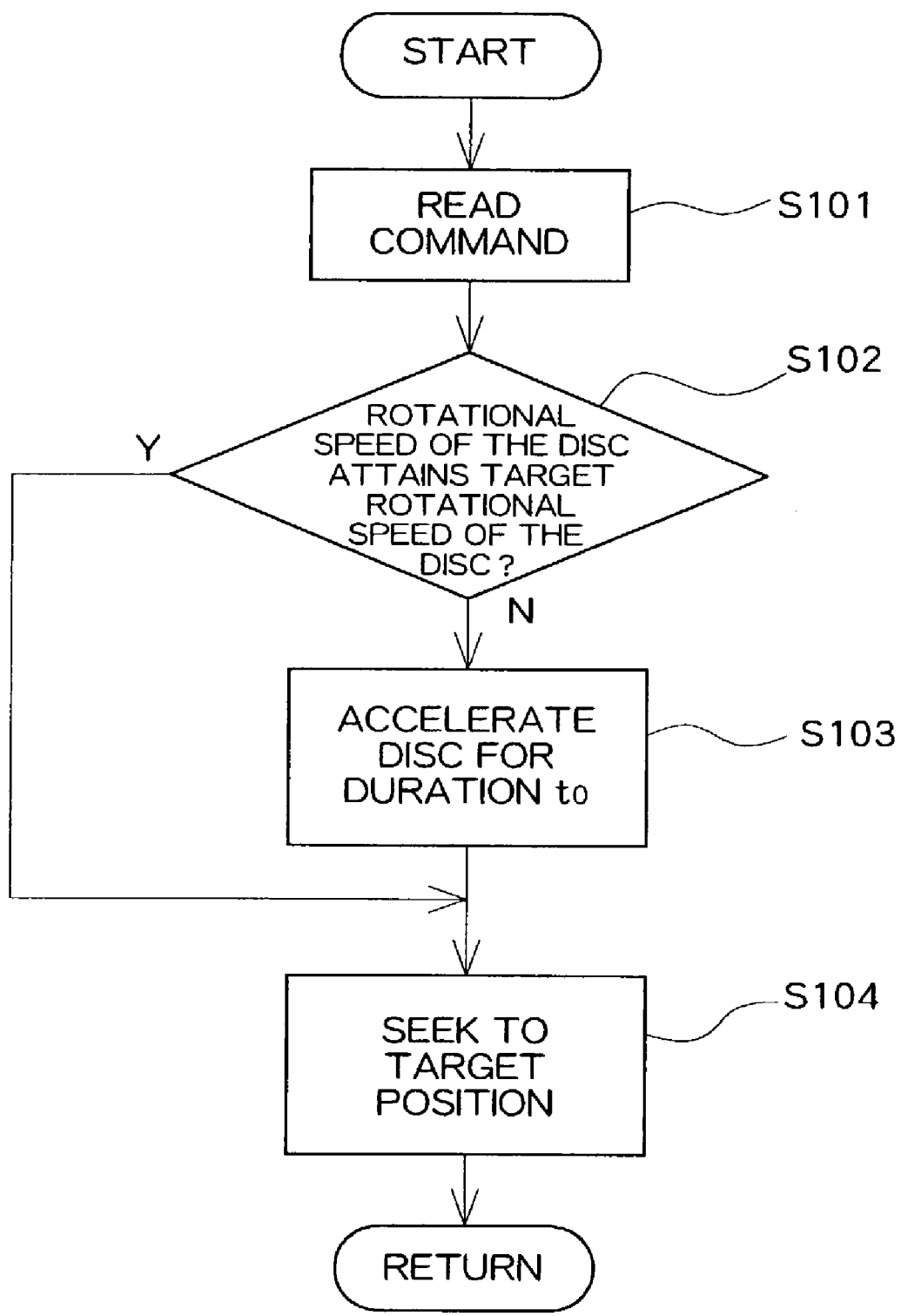
FIG. 5 is a process flowchart according to an example.

Now, a detailed explanation of processes executed by the controller 30 will be described, referring to FIG. 5 in which a process flowchart of the controller 30 is shown. In standby mode, the controller 30 receives a read command from a host device such as a notebook PC (S101). After receiving the read command, the controller 30 resumes (enters into normal operation mode) and then outputs a control signal to the spindle motor 11 to start acceleration of the optical disc 10. The controller 30 monitors the rotational speed of the optical disc 10 to determine whether or not the obtained rotational speed reaches the target rotational speed, for example, a 24× speed (S102). If the optical disc 10 has not yet attained the target rotational speed, the controller 30 delays activation of the thread motor 13 for the delay duration t0 rather than immediately activating the thread motor 13 according to the command. A fixed value may be specified to the delay duration t0 or a value previously stored as a function of the rotational speed and fetched from the memory may be assigned to the delay duration t0. In either case, the delay duration t0 should be set to a value within a time period accepted by the host device as a command execution duration. During the delay duration t0, rotative driving of the optical disc 10 executed by the spindle motor 11 is maintained to accelerate the optical disc 10 (S103). When a timer provided in the controller 30 (and turned ON at a timing when the read command is received) determines that the delay duration t0 has elapsed, together with halting the operation of the spindle motor 11, the controller 30 allows the operation of the thread motor 13 by sending a control signal to the thread motor 13 and causes the optical pick-up 12 to seek to a target radial position based on the read command received from the host device (S104). Accordingly, the spindle motor 11 and the thread motor 13 are not driven at the same time to thereby suppress current consumption.

On the other hand, in a case where the optical disc 10 has already attained the target rotational speed when the read command is received (in the case of YES at process S102), the controller 30 immediately halts the operation of the spindle motor 11 and outputs the control signal to the thread motor 13 to initiate seek movement at once (S104).

In this embodiment, as described above, because seek movement actuated by the thread motor 13 is delayed until the optical disc 10 reaches the target rotational speed to place a higher priority on acceleration of the optical disc 10, the optical disc 10 is quickly accelerated until it reaches the target rotational speed. This quick acceleration enables improvement of reproduction rate. Further, because concurrent driving of the spindle motor 11 and the thread motor 13 is prevented, current consumption can be reduced, resulting in it being possible to extend driving hours powered by a built-in battery even when the drive according to the present invention is incorporated into, for example, a notebook PC.

Figure 6:
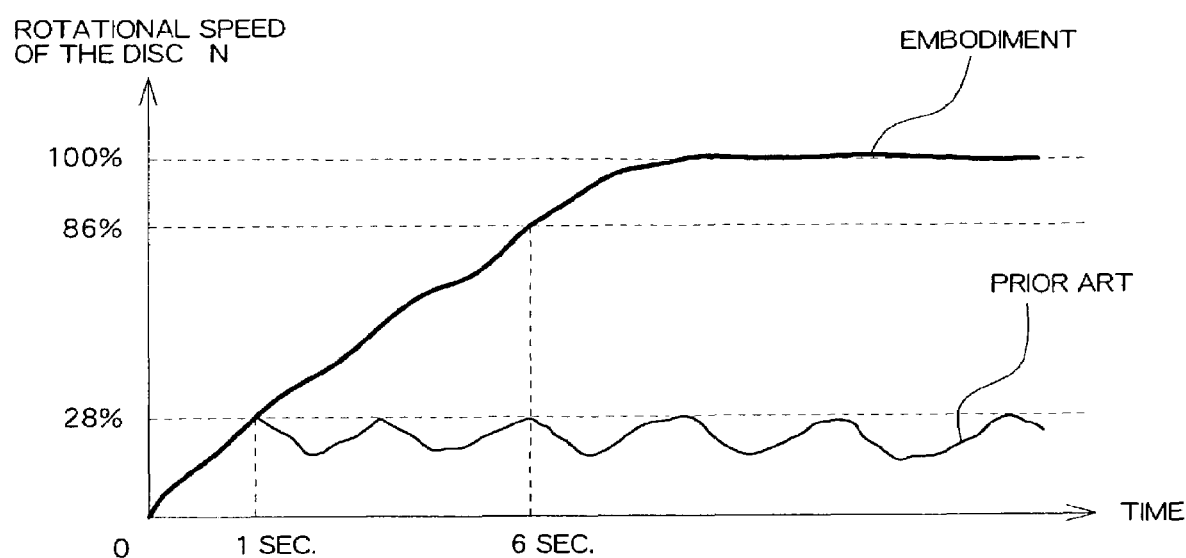
FIG. 6 is a graph representing change of the rotational speed of the disc with respect to time in the example of the present invention and that in a prior-art example.

FIG. 6 shows change of the rotational speed of the disc with respect to time obtained in the present embodiment and also shows that obtained by a prior-art drive to allow easy comparison among the present embodiment and prior art. It is assumed that a current address is identified at the time when the rotational speed of the disc becomes equal to 28% of the target rotational speed. In the prior-art drive, after receiving the read command, the operation of the spindle motor 11 is paused at once and the thread motor 13 is activated at the same time to execute seek movement toward a target address. During seek movement, the rotational speed of the disc decreases. Even in a state where the rotational speed of the disc falls short of 28% of the target rotational speed, if the address is identified, the drive transfers the obtained data to the host device and then goes into a command complete state. Then, the drive reactivates the spindle motor 11 to accelerate the optical disc 10 until a subsequent read command is issued to actually initiate seek movement. When seek movement is started after the subsequent read command is issued and the current address is identified, the operation of the spindle motor 11 is paused so that the rotational speed of the disc declines. Such a repetition of acceleration and deceleration might cause, in the worst command timing, the rotational speed of the disc not reaching the target rotational speed while hovering in the vicinity of 28% thereof.

According to the present embodiment, on the other hand, by assigning a certain length of time (for example, 6 seconds) within the bounds of an execution duration allowed from the host device to a duration of accelerating the optical disc 10 and then executing seek movement after the duration has elapsed, the rotational speed of the disc can reach, for example, 86% of the target rotational speed (for example, a 24× speed) during the assigned 6 seconds, thereby enabling full use of the originally given performance of the drive for subsequent execution durations of read commands.

Having been described the present invention as related to the embodiment, it is understood that the invention is not limited thereto and various changes and modifications may be made in the invention. Although, for example, concurrent operation of the spindle motor 11 and the thread motor 13 is prohibited to reduce current consumption in the present embodiment, the concurrent operation of the spindle motor 11 and the thread motor 13 may be allowed when there is no longer any necessity for extensive acceleration of the optical disc 10 after the optical disc 10 has been accelerated to a certain extent.

Figure 7:
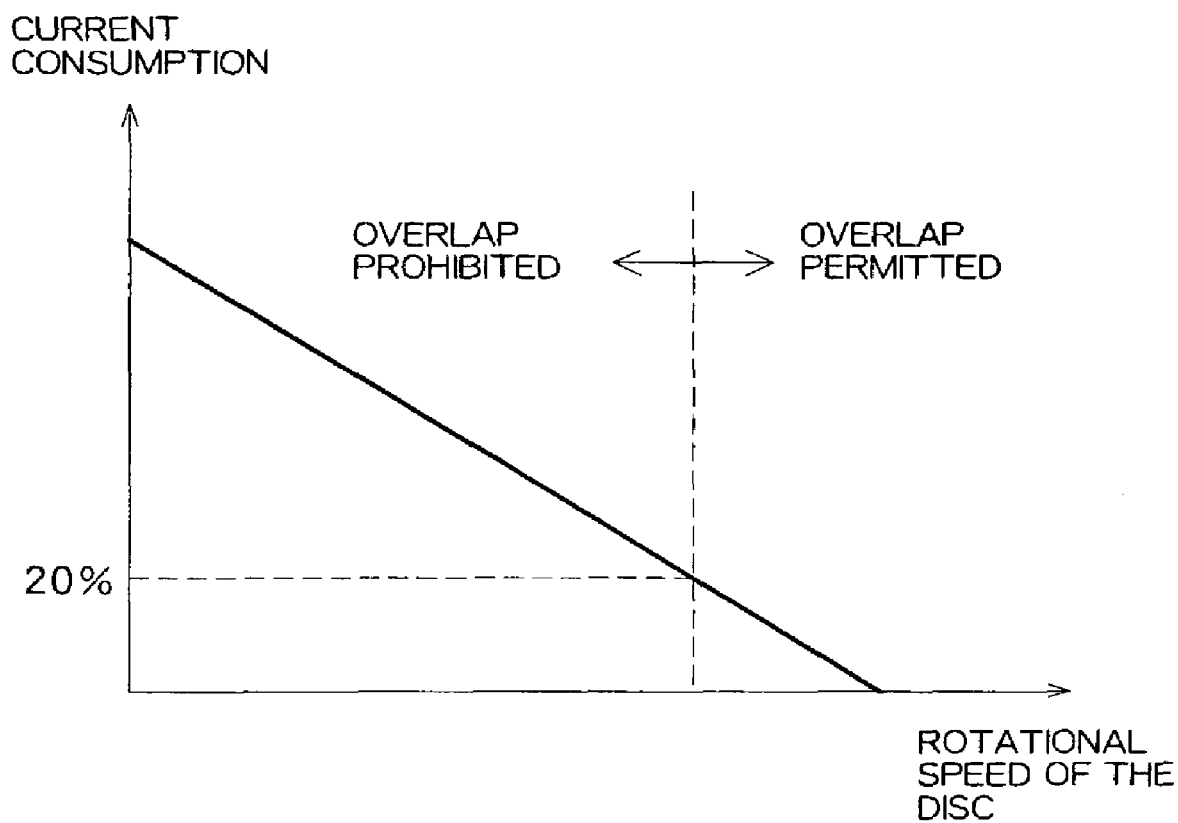
FIG. 7 is a drawing for explaining a relationship between the rotational speed of the disc and overlap (concurrent actuation of a spindle motor and a thread motor)

FIG. 7 shows a relationship between the rotational speed of the disc and current consumption, in which current consumption becomes smaller as the rotational speed of the disc increases. Accordingly, concurrent operation of the spindle motor 11 and the thread motor 13 may be prohibited until the rotational speed at which, for example, current consumption decreases to 20% is attained, whereas the concurrent operation of the spindle motor 11 and the thread motor 13 may be allowed after the rotational speed of the disc reaches the rotational speed with 20% of current consumption. When concurrent operation of the spindle motor 11 and the thread motor 13 is allowed, the controller 30, together with accepting the operation of the spindle motor 11, initiates seek movement at the time when the read command is issued from the host device. Therefore, delay of seek movement becomes unnecessary.

Figure 8:
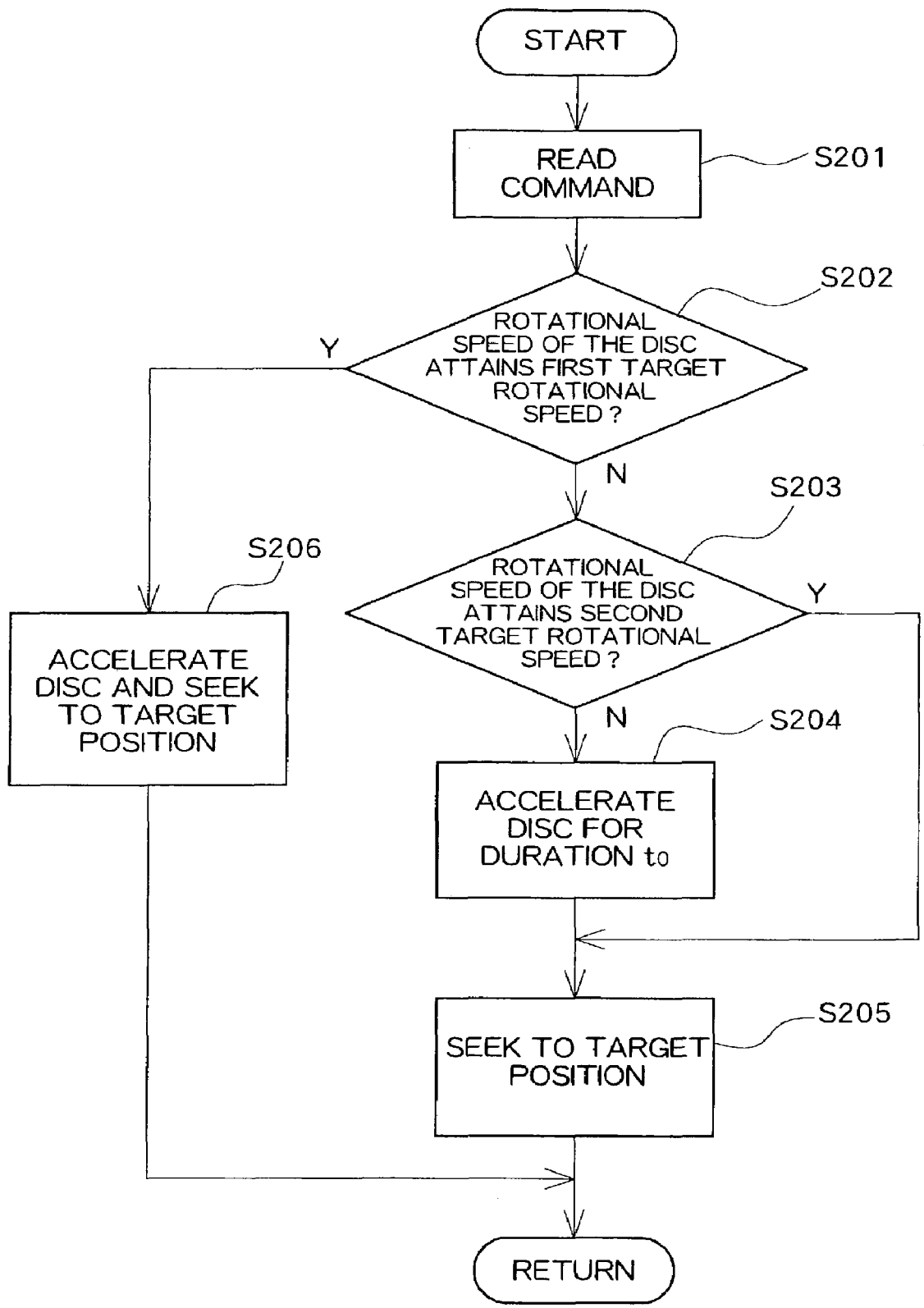
FIG. 8 is a process flowchart according to another example.
Figure 9:
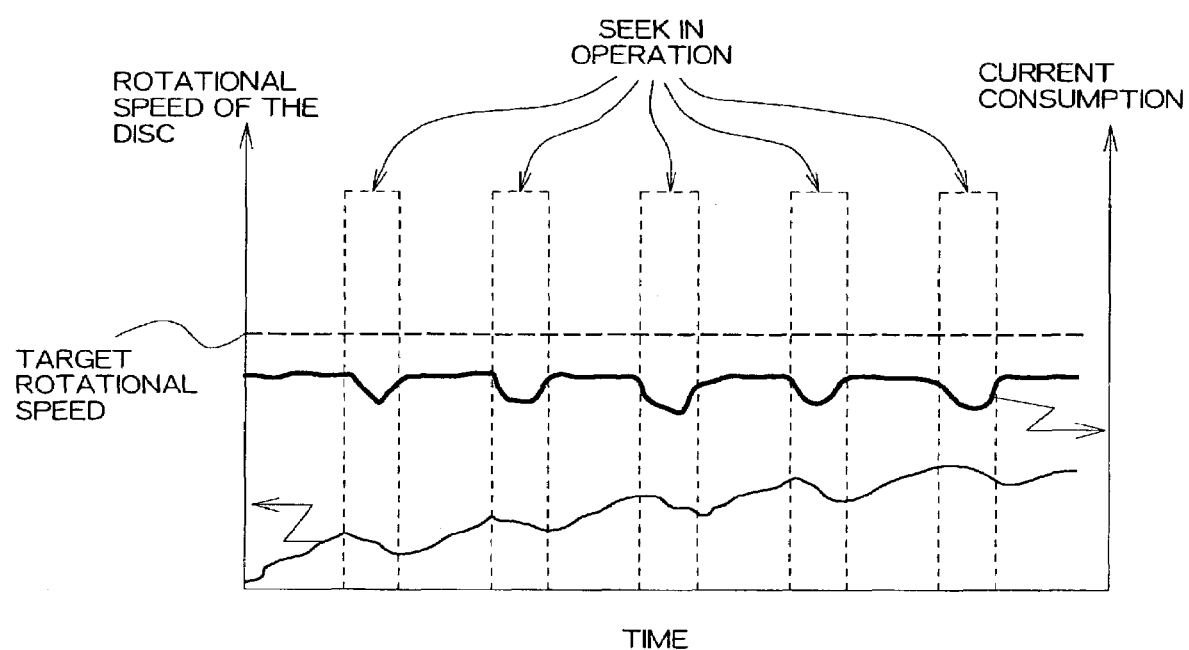
FIG. 9 is a graph representing change of the rotational speed of the disc and current consumption with respect to time in prior art.

FIG. 8 shows a process flowchart of the controller 30 corresponding to the above-described case. After receiving a read command in standby mode (S201), the controller 30 determines whether or not the rotational speed of the disc reaches a first target rotational speed (S202). It should be noted that the first target rotational speed is the rotational speed at which current consumption indicated in FIG. 7 decreases to, for example, 20%. When the rotational speed of the disc does not reach the first target rotational speed, it is further determined whether or not the rotational speed of the disc reaches a second target rotational speed (S203). The second target rotational speed is the same as the target rotational speed shown in FIG. 5 and the first target number of the rotations is larger than the second target rotational speed.

In a state at a low speed where the rotational speed of the disc reaches neither the first nor the second target rotational speed, seek movement is delayed for duration t0 as described above to accelerate the optical disc 10 (S204). Then, after the duration t0 has elapsed, the operation of the spindle motor 11 is paused so as to cause the thread motor 13 to execute seek movement (S205).

On the other hand, in a case where the second target rotational speed is determined as being reached even though the first target rotational speed has not been reached, the operation of the spindle motor 11 is stopped immediately after receiving the read command so as to execute seek movement at once without delay (S206).

Further, in a case where the first target rotational speed is determined as being attained, it is concluded that concurrent operation of the spindle motor 11 and the thread motor 13 causes no problem in terms of current consumption, and seek movement to the target position is executed by the thread motor 13 while maintaining rotative driving executed by the spindle motor 11 (S206). According to the above processes, seek movement can be quickly executed with reduced current consumption.

Also in the processes shown in FIG. 8, the delay duration t0 may be established as the function of the rotational speed of the disc rather than the fixed value. It is also possible to specify a third target rotational speed in addition to the first and second target numbers of rotations (the first target rotational speed>the second target rotational speed>the third target rotational speed) to determine the delay duration t0 relative to the rotational speed of the disc N in stepwise stages as follows:

when N<the third rotational speed;

t0=t2 (duration allowed for command execution—necessary time for seek movement)

when the third target rotational speed≦N<the second target rotational speed;

t0=t2/2, and when the second target rotational speed≦N;

t0=0.

In the present embodiment, when the controller 30 receives a command such as a read or write command requiring seek movement from the host device while the spindle motor 11 is being driven, the controller 30 delays operation start timing of the thread motor 13. In other words, the controller 30 permits (extends) operation of the spindle motor 11 for a predetermined length of time. After extending the operation of the spindle motor 11 for the predetermined length of time, the operation of the spindle motor 11 is paused to initiate the operation of the thread motor 13 which causes the optical pick-up 12 to seek to a desired position. After the completion of seek movement, the spindle motor 11 is reactivated to rotate the optical disc 10. The duration to be extended becomes smaller as the number of the rotations of the optical disc 10 increases, so it becomes 0 when the optical disc 10 attains the target rotational speed.

What is claimed is:

1. An optical disc apparatus comprising:
an optical disc driver for rotating an optical disc;
an optical pick-up for recording/reproducing data to/from said optical disc;
an optical pick-up driver for driving said optical pick-up in a radial direction of said optical disc;
a controller for controlling operation of said optical disc driver and operation of said optical pick-up driver, said controller delaying seek movement of said optical pick-up driver to allow driving operation of said optical disc driver when a seek request is made while said optical disc driver is being driven such that when a read command or a write command is received from a host device, initiation of said seek movement is delayed for a predetermined duration of time which is within a time allowed by the host device as an execution duration for the read command or the write command; and
a detector for detecting rotation speed of said optical disc, wherein a duration of said delay is a time established in accordance with said rotation speed of said optical disc and wherein the duration of said delay is established as a time established so as to become shorter as said rotation speed of said optical disc increases.

2. An optical disc apparatus comprising:
an optical disc driver for rotating an optical disc;
an optical pick-up for recording/reproducing data to/from said optical disc;
an optical pick-up driver for driving said optical pick-up in a radial direction of said optical disc;
a controller for controlling operation of said optical disc driver and operation of said optical pick-up driver, said controller delaying seek movement of said optical pick-up driver to allow driving operation of said optical disc driver when a seek request is made while said optical disc driver is being driven such that when a read command or a write command is received from a host device, initiation of said seek movement is delayed for a predetermined duration of time which is within a time allowed by the host device as an execution duration for the read command or the write command; and
a detector for detecting rotation speed of said optical disc, wherein when said rotation speed of said optical disc does not reach a target rotation speed, said controller delays seek movement of said optical pick-up driver, and when said rotation speed of said optical disc has reached the target rotation speed, said controller does not delay seek movement of said optical pick-up driver and wherein when said rotation speed of said optical disc has reached the target rotation speed, said controller immediately allows driving operation of said optical pick-up driver and halts driving of said optical disc driver while said optical pick-up driver is being driven.

3. An optical disc apparatus comprising:
an optical disc driver for rotating an optical disc;
an optical pick-up for recording/reproducing data to/from said optical disc;
an optical pick-up driver for driving said optical pick-up in a radial direction of said optical disc;
a controller for controlling operation of said optical disc driver and operation of said optical pick-up driver, said controller delaying seek movement of said optical pick-up driver to allow driving operation of said optical disc driver when a seek request is made while said optical disc driver is being driven such that when a read command or a write command is received from a host device, initiation of said seek movement is delayed for a predetermined duration of time which is within a time allowed by the host device as an execution duration for the read command or the write command; and a detector for detecting rotation speed of said optical disc, wherein, taking a first threshold speed as being larger than a second threshold speed, when said rotation speed of said optical disc is lower than the second threshold speed, said controller delays starting driving of said optical pick-up driver, when said rotation speed of said optical disc is equal to or larger than the second threshold speed and lower than said first threshold speed, said controller immediately allows driving operation of said optical pick-up driver and halts driving operation of said optical disc driver, and when said rotation speed is equal to or larger than said first threshold speed, said controller allows driving operation of both said optical disc driver and said optical pick-up driver.

4. An optical disc apparatus comprising:

a spindle motor for rotating an optical disc;

an optical pick-up for recording/reproducing data to/from said optical disc;

a thread motor for driving said optical pick-up in a radial direction of said optical disc;

a controller for controlling operation of both said spindle motor and said thread motor, the controller delaying starting the driving operation of said thread motor and allowing operation of said spindle motor for a delay duration when a command associated with writing or reading is received while said spindle motor is being driven such that when a read command or a write command is received from a host device, initiation of seek movement is delayed for a predetermined duration of time which is within a time allowed by the host device as an execution duration for the read command or the write command; and a detector for detecting rotation speed of said optical disc, wherein said controller establishes said delay duration so as to become shorter as said rotation speed of said optical disc increases.

5. An optical disc apparatus according to claim 4, wherein said controller assigns zero to said delay duration when said rotation speed of said optical disc reaches a target rotation speed.

6. An optical disc apparatus according to claim 5, wherein said controller drives said thread motor immediately after receiving said command and does not drive said spindle motor while said thread motor is being driven when said rotation speed of said optical disc reaches a target rotation speed.

7. An optical disc apparatus comprising:

a spindle motor for rotating an optical disc;

a thread motor for recording/reproducing data to/from said optical disc;

a controller for controlling operation of both said spindle motor and said thread motor, wherein a command associated with writing or reading is received while said spindle motor is driven, said controller allows operation of said spindle motor for a predetermined time after receiving said command, and after the predetermined time has elapsed, said controller allows starting the driving operation of said thread motor and halts operation of said spindle motor such that when a read command or a write command is received from a host device, initiation of seek movement is delayed for a predetermined duration of time which is within a time allowed by the host device as an execution duration for the read command or the write command; and a detector for detecting rotation speed of said optical disc, wherein said predetermined time is a variable length of time established in accordance with said rotation speed and wherein said predetermined time becomes shorter as said rotation speed increases.

8. An optical disc apparatus according to claim 7, wherein said predetermined time becomes zero when said rotation speed reaches a target rotation speed.

\* \* \* \* \*